United States Patent [19]
Laznicka, Jr.

[11] Patent Number: 5,231,611
[45] Date of Patent: Jul. 27, 1993

[54] WAVELENGTH MULTIPLEXED FIBER OPTICS RESONANT RING HYDROPHONE ARRAY

[75] Inventor: Oldrich M. Laznicka, Jr., Wellesley, Mass.

[73] Assignee: The Charles Stark Draper Laboratory, Inc., Cambridge, Mass.

[21] Appl. No.: 942,517

[22] Filed: Sep. 9, 1992

[51] Int. Cl.$^5$ .................. H04B 9/00; H04R 23/00
[52] U.S. Cl. .................. 367/149; 367/153; 359/141; 356/345; 250/227.14
[58] Field of Search .......... 367/149, 153, 154; 359/141, 189, 195; 250/227.11, 227.14, 227.25; 356/345, 349

[56] References Cited

U.S. PATENT DOCUMENTS

| | | | |
|---|---|---|---|
| 4,451,151 | 5/1984 | Huignard | 356/345 |
| 4,648,083 | 3/1987 | Giallorenzi | 367/149 |
| 4,875,775 | 10/1989 | Michal et al. | 367/149 |
| 5,051,965 | 9/1991 | Poorman | 367/149 |
| 5,155,548 | 10/1992 | Danver et al. | 356/345 |

Primary Examiner—J. Woodrow Eldred
Attorney, Agent, or Firm—Lahive & Cockfield

[57] ABSTRACT

A hydrophone array employing a plurality of laser sources coupled onto a single optical fiber communications link. A matching plurality of optical fiber resonant rings, each having a resonance peak at a wavelength substantially equal to the center wavelength of one of the lasers, is selectively coupled to the optical fiber communication link so that substantially only optical energy in a narrow bandwidth around one of the laser center wavelengths is coupled to the corresponding one of the optical fiber resonant rings. Corresponding photodetectors are also wavelength selectively coupled to the optical fiber communications link so that each detector receives only optical energy corresponding to the wavelength of one of the lasers and its corresponding resonant ring, to provide an output signal indicating variations in acoustic pressure at individual resonant rings in the array.

8 Claims, 2 Drawing Sheets

WAVELENGTH MULTIPLEXED FIBER OPTICS RESONANT RING HYDROPHONE ARRAY

BACKGROUND OF THE INVENTION

This invention relates in general to sonar sensor arrays and more specifically to a sonar sensor array in a configuration including several spaced-apart sensors at remote locations, without requiring power to be transmitted to those sensors.

Sonar sensors and sensor arrays play an important part in undersea applications of various types. In the prior art, sensors typically employed piezoelectric transducers and interferometric transducers. Both of these have limited sensitivity and dynamic range. The particular drawback of the piezoelectric transducer is a requirement for remote powering, which introduces complexity of overall design and size restrictions which limit sensitivity. An interferometric sensor requires a stable fiber optic reference. Such a reference imposes sensitivity limitations on the sonar sensor due to the signal level available to the reference from the transducer. Another limiting factor is the requirement that this reference be isolated from external influences which would affect its accuracy.

SUMMARY OF THE INVENTION

Broadly speaking, in the present invention, a hydrophone array is provided in which a plurality of laser sources, each characterized by a different center wavelength, is coupled onto a single optical fiber communications link. The array includes a corresponding plurality of optical fiber resonant rings, each having a length such that it has a resonance peak at a wavelength substantially equal to the center wavelength of one of the lasers. The resonant rings are selectively coupled to the optical fiber communication link, so that substantially only optical energy in a narrow bandwidth around each of the laser center wavelengths is coupled to corresponding optical fiber resonant ring. A series of corresponding photodetectors is also selectively coupled to the optical fiber communications link such that substantially only optical energy in a the narrow band width around each of the laser center wavelengths is coupled to a corresponding detector. Each of the photodetectors provides an output signal corresponding to the variations in intensity of light incident upon it. With this arrangement each of the optical fiber resonant rings serves as a separate transducer, the system being wavelength multiplexed to provide separable signals for each transducer along the array. Since optical fiber resonant rings are sensitive to acoustic pressure each of the signals represent variations in acoustic pressure at one of the rings. Various means, such as spiral winding of the optical fiber can be employed to suppress variations in signals from the rings due to inertial rotation effects.

In a second embodiment, time multiplexing may also be introduced so that each one of the optical fiber resonant rings is separately addressed at a different time. In such an embodiment the laser input to the rings is both frequency and time multiplexed, thereby enabling the output from a single detector to be synchronized with the time multiplexed laser signals coupled onto the link. The signals from the detector in each of the time slots then corresponds to the acoustic pressure at a different resonant ring.

DESCRIPTION OF PREFERRED EMBODIMENTS

Figure 1:
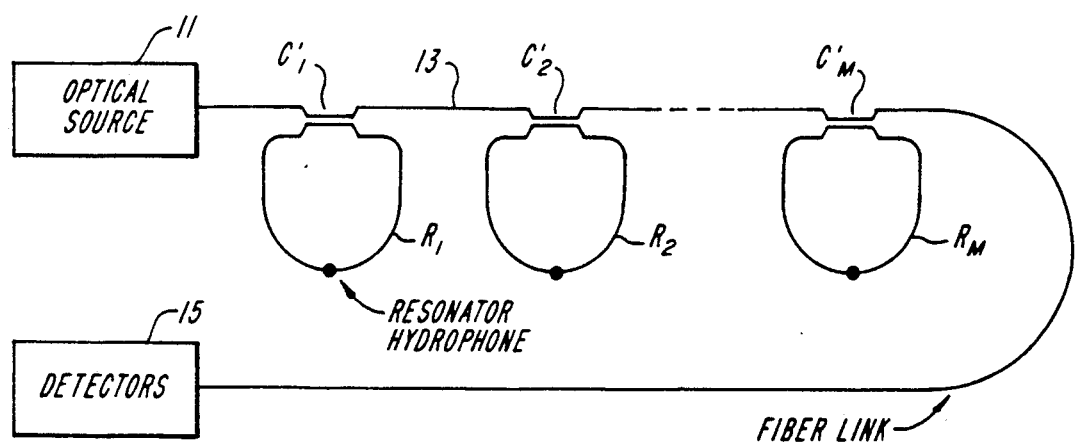
FIG. 1 is an illustration in diagrammatic form of a sonar sensing system constructed in accordance with the principles of this invention.

FIGS. 1, 2, 3, and 4 illustrate one embodiment of a phased sonar array constructed in accordance with the principles of this invention.

A laser array 11 is shown coupled to single fiber optic communications link 13 through a series of couplers $C_2$ through $C_n$. An array of optical fiber resonant rings $R_1$ through $R_n$ are coupled through a second series of couplers $C'_2$ through $C'_n$ to that same fiber optic communications link 13. Finally a series of detectors 15 are coupled to communications link 13 through a third series of couplers $C''_1$ through $C''_n$. Although it is not necessary, the detectors could be coupled through a feedback loop back to the array of lasers 11. The optical fiber resonant rings $R_1$ through $R_n$ serve as detectors of acoustic pressure because their characteristic resonance frequency is determined by the length of the path for light transmitted around the ring through the optical fiber. The effective path length around the ring is changed by acoustic pressure, temperature, and inertial rotation (the Sagnac effect). If the temperature and the inertial rotation is kept constant, or compensated for, then variations in the effective path length and hence in the resonant frequency or wavelength of the ring will depend substantially only upon the acoustic pressure. For each resonant ring detector there is a corresponding laser in the laser array 11 and a corresponding detector in the detector array 17.

In order to provide for separable signals from each of the resonant rings, the rings are formed of different lengths so that their resonant frequencies are shifted from one another. The corresponding laser for each ring is arranged to emit light at a center frequency substantially equal to the resonant frequency of the ring. Each of the couplers $C_2$ through $C_n$ coupling the laser light into the communications link 13 are wavelength selective. The couplers $C'_1$ though $C'_n$ are also wavelength selective and thus light passes to each ring only at a wavelength corresponding to the frequency of resonance of that ring.

On this basis light emitted from a laser effectively couples only to its corresponding ring. Signals at that frequency are again coupled through similar selective couplers to a corresponding detector. Each detector provides an output signal indicative of the acoustic pressure at one of the rings. The overall array is thereby wavelength multiplexed.

Figure 2:
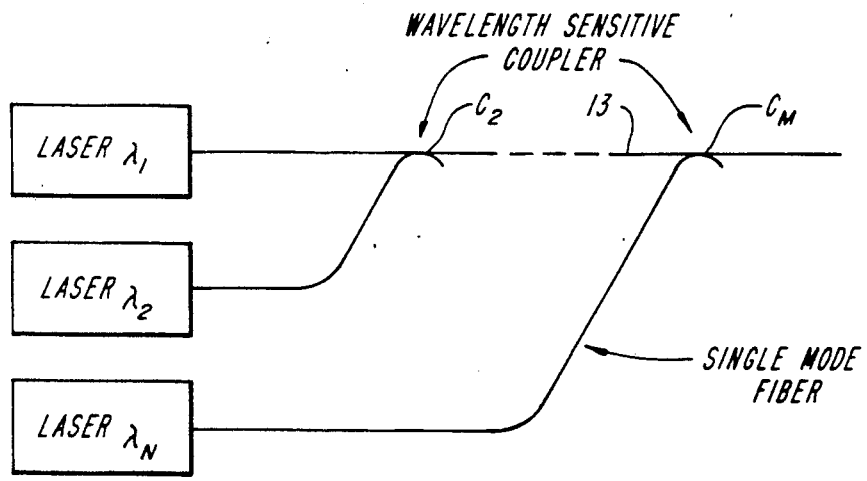
FIG. 2 is a diagrammatic illustration of a laser array of FIG. 1, selectively coupled to an optical fiber communication link.

FIG. 2 is an illustration in further detail of a typical source 11 of the system illustrated in FIG. 1. The illustration shows a series of three laser sources, $\lambda_1$ through $\lambda_n$. Each of these may be laser Fabry-Perot laser diodes operating, as indicated, at different wavelengths. Since the lasers do not have to have a narrow line width these laser diodes will be suitable for a relatively low cost system. Individual laser diodes are coupled onto the optical fiber communications link 13 through a series of wavelength sensitive couplers, $C_2$ through $C_n$. The communication link 13 consists of an optical fiber operating in the single mode region, typically at a wavelength of approximately 1300 nm to approximately 1550 nm with low insertion loss (typically 0.3 dB/km).

As indicated above, the function of the wavelength sensitive couplers $C_2$ through $C_n$ and $C'_1$ through $C'_n$ is to wavelength multiplex the optical signals to provide for independent sensing of the variations in acoustic pressure at each of the sensor rings $R_1$ through $R_n$. The number of sensors coupled through a single optical fiber communications link is limited by the bandwidth (typically 250 nm) of the link and the wavelength selectivity characteristic of the couplers. Therefore, if the bandwidth of the couplers can be reduced to 10 nm, typically more than 20 sensors can be included on a single link.

The distance between the optical source and the furthermost sensor on such an array can be as much as several hundreds of meters.

Figure 3:
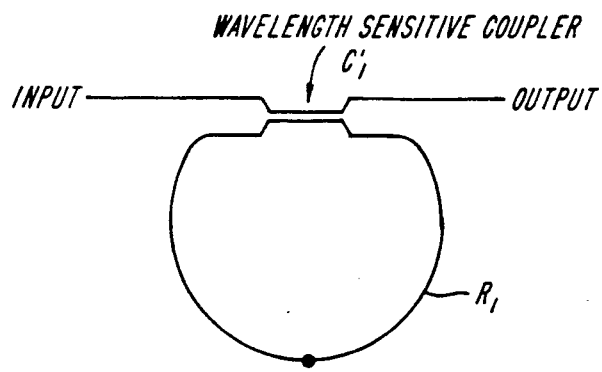
FIG. 3 is a diagrammatic illustration of an optical fiber resonant ring of FIG. 1, coupled through a wavelength selective coupler to an optical fiber communication link.

FIG. 3 is a general schematic illustration of a sensor element $R_1$ for the system of FIG. 1. The sensor element includes a selected length of single mode optical fiber arranged as a resonating ring. This ring is coupled to the communications link 13 through the wavelength selective coupler $C'_1$. The optimum resonance condition for the ring is achieved when the wavelength selective coupler and fiber insertion losses are matched with the weak coupling ratio of the coupler. During resonance the recirculating optical wavelength amplitude in the ring increases because its phase is matched to the ring input wave phase from the coupler. The output from the coupler at resonance is substantially zero because the non-coupled wave, passing along the optical fiber link and the recirculating wave within the ring are approximately 180° out of phase and thus cancel each other. Therefore, when the optical energy coupled to the ring through the coupler is not at the resonant wavelength of the ring, the output from the ring coupler transmitted along the optical fiber communications link is at a maximum value. For a given situation of ambient temperature and pressure, the resonance condition is determined by the length of the optical fiber in the ring. Different rings will have different resonances if the lengths of those rings are different. Provided that the wavelength selectivity of the coupler is matched to the resonant wavelength of the ring, each sensor will respond to variations in the acoustic pressure by shifting the resonant wavelength and producing a signal varying in amplitude as the wavelength characteristic of that particular sensor shifts.

Each sensor in the array is provided with an optical input of specific wavelength. This input is generated by a corresponding one of the laser sources and is coupled to the sensor through a wavelength selective coupler. As previously discussed, the central wavelengths of each laser source and of each ring resonance should be separated sufficiently so that no substantial portion of the light emitted from, for example, the optical source $\lambda_2$ is coupled into the resonant ring $R_1$. The specific bandwidth of the wavelength selective coupler is 50 nm and the change in the resonance wavelength between adjacent rings is selected to be 100 nm. With a suitable design of selective couplers, the following characteristics can be achieved.

Figure 5:
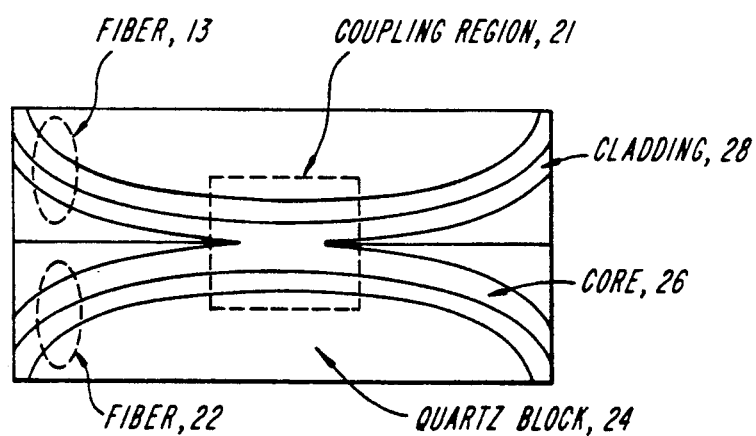
FIG. 5 is an illustration of the construction of a wavelength selective coupler for use in the system of FIG. 1.

$R_1$ operates at $\lambda_1 = 1.32$ $\mu$m
$R_2$ operates at $\lambda_2 = 1.42$ $\mu$m
$R_3$ operates at $\lambda_3 = 1.52$ $\mu$m
$C_2$ is centered at 1.32 $\mu$m
Bandwidth $(\lambda) \leq 50$ nm
Coupling $\simeq 4\%$
Loss (insertion) $\leq 0.1$ dB
$C_3$ is centered at 1.42 $\mu$m
Bandwidth $(\lambda) \leq 50$ nm
$C_4$ is centered at 1.52 $\mu$m
Bandwidth $(\lambda) \leq 50$ nm A typical physical configuration for a wavelength selective coupler to perform the functions of the couplers illustrated in FIGS. 1 trough 4 is illustrated in FIG. 5. In the coupler of FIG. 5 the optical fibers 13 and 22 are spliced together in a quartz block 24. The wavelength sensitivity of this coupler is achieved by an asymmetric configuration within this coupling region. The asymmetry is produced by constructing the two coupled optical fibers with slight differences, either in core diameter or in refractive index (produced by dimensional or material differences in the fiber core-cladding), so that the optical propagation constants of the two fibers coupled together are different. Utilizing conventional optical fibers and careful polishing technique it is possible to build low loss wavelength sensitive couplers with 10 nm-20 nm bandwidth and maximum side lobe of $-15$ dB. Using this configuration approximately 4% of the light energy at a specific wavelength passing along the communications link 13 is coupled into the corresponding resonant ring.

While in the illustrated resonant ring configuration, response to variations in acoustic pressure may simply be the response of the optical fiber itself, this response may be enhanced by techniques which amplify the changes in the light path of the fiber due to variations in acoustic pressure.

Figure 4:
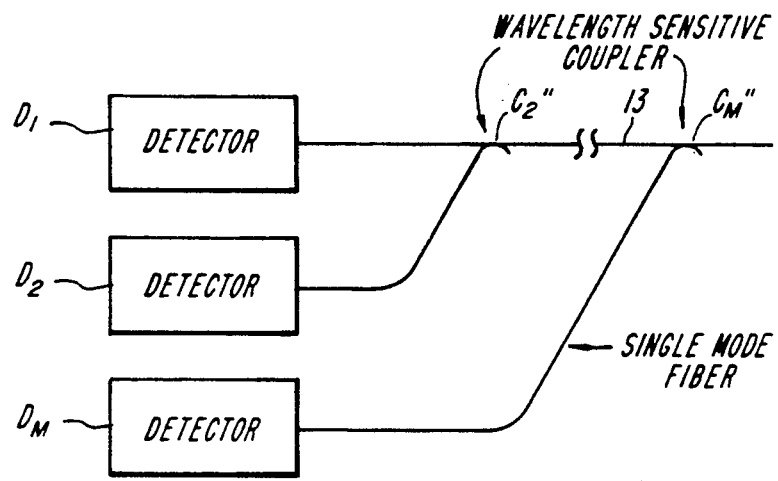
FIG. 4 is an illustration in diagrammatic form of a detector array suitable for use in the system of FIG. 1.

FIG. 4 illustrates a detector arrangement suitable for use as the detector 15 in a hydrophone array as illustrated in FIG. 1. The detector includes a series of detectors $D_1$ through $D_n$ coupled to the communications link 13 through wavelength sensitive couplers CK through $C''_n$ of the type previously described. Again, each of the wavelength sensitive couplers would pass light at a wavelength corresponding to the resonant wavelength of a corresponding sensor ring. With such an arrangement, the detectors are wavelength multiplexed so that each detector receives substantially only signals corresponding to a specific one of the sensor rings. Each of the detectors $D_1$ through $D_n$ are typically photodetectors exhibiting square law behavior. A suitable detector is a standard telecommunication detector, e.g., QDFT pinFET module manufactured by Lasertron, Inc., Burlington, Mass.

The specific configuration of the hydrophone array shown in FIG. 1 may constitute a single segment, with up to 20 wavelength multiplexed hydrophones on it. For a complete optical fiber resonant hydrophone array more segments such as those shown in FIG. 1 would be required. Since the phase relationship between each of the resonant rings is known, each segment of hydrophones can serve as an acoustic phased array.

Having described this embodiment, it will be realized that various embodiments and implementations of this invention may be realized.

I claim:

1. A hydrophone array for measurement of variations in acoustic energy incident thereon, comprising, a plurality of coherent light sources, each providing an output optical beam characterized by a different center wavelength, an optical fiber communication link, coupling means for coupling the output from each of said coherent light sources into said optical fiber communications link, a plurality of optical fiber resonant rings, each of said rings having a resonance at a wavelength substantially equal to the center emission wavelength of one of said plurality of coherent light sources, wavelength selective coupling means coupling each of said optical fiber resonant rings to said fiber optic communication link such that only light at a wavelength substantially equal to the resonant wavelength of said optical fiber resonant ring is coupled to each of said optical fiber resonant rings, and detector means coupled to said optical fiber communication link for sensing variations in the intensity of light in said optical fiber communications link selectively at wavelengths corresponding to the resonance wavelengths of said fiber optical resonant rings to provide a series of output electrical signals, each representative of the variation in intensity of optical energy at a selected wavelength transmitted along said communications link as an indication of variations in acoustic pressure incident upon each of said optical fiber resonance rings.

2. A hydrophone array in accordance with claim 1 wherein said detector means comprises a plurality of detectors, each coupled to said optical fiber communications link through a coupler which is selective for a wavelength corresponding to the resonant wavelength of one of said resonant rings.

3. A hydrophone array in accordance with claim 1 wherein each of said laser output beams is coupled to said communication link at a separate time to effectively time multiplex coupling of light to each of said plurality of optical fiber resonance rings, and wherein said detector means constitutes one detector providing a signal output which is time divided in synchronism with said time multiplexing to provide in a predetermined time sequence, output signals corresponding to variations in resonance at each of said plurality of optical fiber resonance rings.

4. A hydrophone array in accordance with claim 1 wherein each of said plurality of coherent light sources is a Fabry-Perot laser diode.

5. A hydrophone array in accordance with claim 1 wherein each of said wavelength selective coupling means has a bandwidth of substantially ten nanometers and wherein said plurality of optical fiber resonant rings and corresponding coherent light sources includes up to twenty light sources and optical fiber resonant rings on a single optical fiber communication link.

6. A hydrophone array in accordance with claim 1 wherein each of said optical fiber resonant rings is a closed loop and each of said couplers is arranged to couple a small fraction of light transmitted at said selected wavelength along said optical fiber communications link to each of said rings.

7. A method of measuring variations in acoustic pressure incident upon a hydrophone array comprising the steps of, providing a plurality of laser beams, each characterized by a separate center wavelength, coupling each of said laser beams into an optical fiber communications link, coupling each of a plurality of hydrophone sensors, each formed of an optical fiber resonant ring having a resonance at a wavelength substantially equal to the center emission wavelength of one of said laser beams into said optical fiber communications link, wherein each of said resonant rings is optically coupled to said optical fiber communications link such that only light at a wavelength substantially equal to its resonant wavelength is coupled to it, selectively sensing variations in the intensity of light transmitted along said communications link at wavelengths corresponding to the resonant wavelengths of said resonant rings, and providing a series of output electrical signals, each representative of the variation in light intensity at a selected wavelength transmitted along said communications link, as an indication of variations in acoustic pressure incident upon a resonant ring having its resonance at said selected wavelength.

8. A method in accordance with claim 7 wherein said selective sensing of variations in intensity of light transmitted along said communications link is achieved by a plurality of detectors, each coupled to said communications link through a coupler which is selective for a wavelength corresponding to the resonant wavelength of one of said resonant rings.

* * * * *